United States Patent
Lin

(10) Patent No.: US 12,452,926 B2
(45) Date of Patent: Oct. 21, 2025

(54) DEVICES AND METHODS FOR DATA TRANSMISSIONS

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 322 days.

(21) Appl. No.: 18/339,872

(22) Filed: Jun. 22, 2023

(65) Prior Publication Data
US 2023/0337285 A1    Oct. 19, 2023

Related U.S. Application Data

(63) Continuation of application No. PCT/IB2021/000053, filed on Jan. 8, 2021.

(51) Int. Cl.
*H04W 74/0816* (2024.01)
*H04W 74/00* (2009.01)
(Continued)

(52) U.S. Cl.
CPC ..... *H04W 74/0816* (2013.01); *H04W 74/004* (2013.01); *H04W 74/006* (2013.01);
(Continued)

(58) Field of Classification Search
CPC ........... H04W 74/0816; H04W 74/004; H04W 72/23; H04W 74/0808; H04W 74/006; H04W 74/0833
See application file for complete search history.

(56) References Cited

U.S. PATENT DOCUMENTS

| 2016/0227578 | A1 | 8/2016 | Lee et al. |
| 2019/0029071 | A1* | 1/2019 | Moon .................. H04B 7/0639 |
| 2021/0029552 | A1 | 1/2021 | Murayama et al. |

FOREIGN PATENT DOCUMENTS

WO    2019186916 A1    10/2019

OTHER PUBLICATIONS

LG Electronics: "Physical layer procedures for NR unlicensed operation",3GPP Draft; R1-1804582, 3rd Generation Partnership Project (3GPP), Mobile Competence Centre ; 650, Route Des Lucioles ; F-06921 Sophia-Antipolis Cedex; France vol. RAN WG1, No. Sanya, China; Apr. 16, 2018-Apr. 20, 2018 Apr. 15, 2018 (Apr. 15, 2018), XP051426850, Retrieved from the Internet:URL:http://www.3gpp.org/ftp/Meetings%5F3GPP%5FSYNC1RANI/Docs/ [retrieved on Apr. 15, 2018], p. 2, lines 9-13.

(Continued)

*Primary Examiner* — Omar J Ghowrwal
(74) *Attorney, Agent, or Firm* — Ladas & Parry LLP

(57) ABSTRACT

An apparatus and a method of wireless communication are provided. The method by a first wireless communication device includes transmitting, by the first wireless communication device to a second wireless communication device, a first message, and after the first wireless communication device transmits the first message to the second wireless communication device and the first wireless communication device receives a second message relevant to the first message from the second wireless communication device, the first wireless communication device transmits a data transmission to the second wireless communication device.

16 Claims, 27 Drawing Sheets

(51) Int. Cl.
*H04W 74/0808* (2024.01)
*H04W 74/0833* (2024.01)
*H04W 72/23* (2023.01)

(52) U.S. Cl.
CPC ... *H04W 74/0808* (2013.01); *H04W 74/0833* (2013.01); *H04W 72/23* (2023.01)

(56) References Cited

OTHER PUBLICATIONS

International Search Report in the international application No. PCT/IB2021/000053, mailed on Nov. 16, 2021.
Written Opinion of the International Search Authority in the international application No. PCT/IB2021/000053, mailed on Nov. 16, 2021.
3rd Generation Partnership Project;Technical Specification Group Radio Access Network;"Study on supporting NR from 52.6 GHz to 71 GHz(Release 17)", 3GPP TR 38.808 V0.2.0 (Nov. 2020).

* cited by examiner

DEVICES AND METHODS FOR DATA TRANSMISSIONS

CROSS-REFERENCE TO RELATED APPLICATION

The present disclosure is a US continuation application of International Application No. PCT/IB2021/000053 filed on Jan. 8, 2021. The disclosure of the above PCT application is hereby incorporated by reference in its entirety.

BACKGROUND

An unlicensed spectrum is a shared spectrum. A communication device in different communication systems can use the unlicensed spectrum as long as the communication device meets regulatory requirements set by the country or region on the unlicensed spectrum and does not need to apply for a proprietary spectrum authorization from the government.

In order to allow various communication systems that use the unlicensed spectrum for wireless communication to coexist friendly in the unlicensed spectrum, some countries or regions specify regulatory requirements that must be met to use the unlicensed spectrum. For example, the communication device follows the principle of "a channel access procedure (or called a listen before talk (LBT) procedure", that is, the communication device needs to perform channel sensing before transmitting a signal on the channel. Only when the LBT outcome shows that the channel is idle, the communication device can perform signal transmission, or otherwise, the communication device cannot perform the signal transmission. In order to ensure fairness, once the communication device successfully occupies the channel, a transmission duration cannot exceed the maximum channel occupancy time (MCOT). The LBT mechanism is also called channel access procedure. In a new radio (NR) release 16 (R16), there are different types of channel access procedures, e.g. type 1, type 2A, type 2B, and type 2C channel access procedures as described in a third generation partnership project (3GPP) technical specification (TS) 37.213.

SUMMARY

The present disclosure relates to the field of communication systems, and more particularly, to an apparatus and a method of wireless communication, which can provide a good communication performance and/or high reliability.

An object of the present disclosure is to propose an apparatus and a method of wireless communication, which can solve issues in the prior art, solve a hidden node issue, reduce signaling overhead, provide a good communication performance, and/or provide high reliability.

In a first aspect of the present disclosure, a wireless communication method by a first wireless communication device comprises transmitting, by the first wireless communication device to a second wireless communication device, a first message, and after the first wireless communication device transmits the first message to the second wireless communication device and the first wireless communication device receives a second message relevant to the first message from the second wireless communication device, the first wireless communication device transmits a data transmission to the second wireless communication device.

In a second aspect of the present disclosure, a wireless communication method by a second wireless communication device comprises receiving, by the second wireless communication device from a first wireless communication device, a first message, and after the second wireless communication device receives the first message from the first wireless communication device and the second wireless communication device transmits a second message relevant to the first message to the first wireless communication device, the second wireless communication device receives a data transmission from the first wireless communication device.

In a third aspect of the present disclosure, a first wireless communication device comprises a memory, a transceiver, and a processor coupled to the memory and the transceiver. The processor is configured to control the transceiver to transmit to a second wireless communication device, a first message and after the transceiver transmits the first message to the second wireless communication device and the transceiver receives a second message relevant to the first message from the second wireless communication device, the transceiver transmits a data transmission to the second wireless communication device.

In a fourth aspect of the present disclosure, a second wireless communication device comprises a memory, a transceiver, and a processor coupled to the memory and the transceiver. The processor is configured to control the transceiver to receive from a first wireless communication device, a first message and after the transceiver receives the first message from the first wireless communication device and the transceiver transmits a second message relevant to the first message to the first wireless communication device, the transceiver receives a data transmission from the first wireless communication device.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
FIG. 1 is a schematic diagram illustrating that a device A is in communication with a device B and a device C is a hidden node to the device A according to an embodiment of the present disclosure.

When operation in the shared spectrum, a potential issue is a hidden node situation. As illustrated in FIG. 1, where a device A is in communication with a device B. and a device C is a hidden node to the device A as the device A cannot detect the presence of the device C even if the device A performs a channel access procedure before transmitting information to the device B. The device C causes interference to the device B when at least one of the device B and the device C communicate.

Therefore, there is a need for an apparatus and a method of wireless communication, which can solve issues in the prior art, solve a hidden node issue, reduce signaling overhead, provide a good communication performance, and/or provide high reliability.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 2:
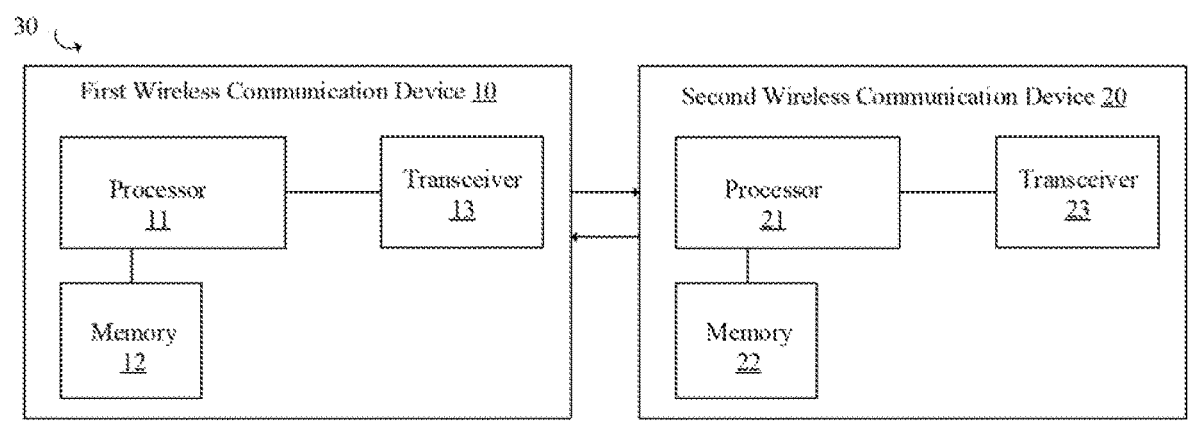
FIG. 2 is a block diagram of a first wireless communication device and a second wireless communication device of communication in a communication network system according to an embodiment of the present disclosure.

FIG. 2 illustrates that, in some embodiments, a first wireless communication device 10 and a second wireless communication device 20 of communication in a communication network system 30 according to an embodiment of the present disclosure are provided. The communication network system 30 includes the first wireless communication device 10 and the second wireless communication device 20. In some embodiments, the first wireless communication device 10 is a base station or a generation node B (gNB), and the second wireless communication device 20 is a user equipment WE). Optionally, the first wireless communication device 10 is a UE and the second wireless communication device 20 is a base station or gNB. Optionally, the first wireless communication device 10 is a UE, and the second wireless communication device 20 is another UE. The first wireless communication device 10 may include a memory 12, a transceiver 13, and a processor 11 coupled to the memory 12 and the transceiver 13. The second wireless communication device 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to control the transceiver 13 to transmit to the second wireless communication device 20, a first message and after the transceiver 13 transmits the first message to the second wireless communication device 20 and the transceiver 11 receives a second message relevant to the first message from the second wireless communication device 20, the transceiver 13 transmits a data transmission to the second wireless communication device 20. This can solve issues in the prior art, solve a hidden node issue, reduce signaling overhead, provide a good communication performance, and/or provide high reliability.

In some embodiments, the processor 21 is configured to control the transceiver 23 to receive from a first wireless communication device 10, a first message and after the transceiver 23 receives the first message from the first wireless communication device 10 and the transceiver 23 transmits a second message relevant to the first message to the first wireless communication device 10, the transceiver 23 receives a data transmission from the first wireless communication device 10. This can solve issues in the prior art, solve a hidden node issue, reduce signaling overhead, provide a good communication performance, and/or provide high reliability.

Figure 3:
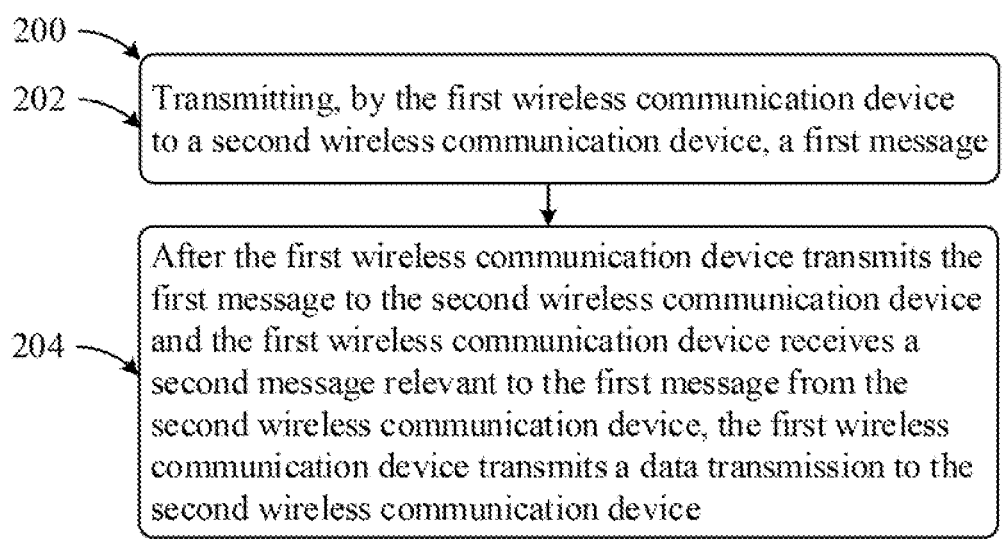
FIG. 3 is a flowchart illustrating a wireless communication method performed by a first wireless communication device according to an embodiment of the present disclosure.

FIG. 3 illustrates a wireless communication method 200 performed by a first wireless communication device according to an embodiment of the present disclosure. In some embodiments, the method 200 includes: a block 202, transmitting, by the first wireless communication device to a second wireless communication device, a first message, and a block 204, after the first wireless communication device transmits the first message to the second wireless communication device and the first wireless communication device receives a second message relevant to the first message from the second wireless communication device, the first wireless communication device transmits a data transmission to the second wireless communication device. This can solve issues in the prior art, solve a hidden node issue, reduce signaling overhead, provide a good communication performance, and/or provide high reliability.

Figure 4:
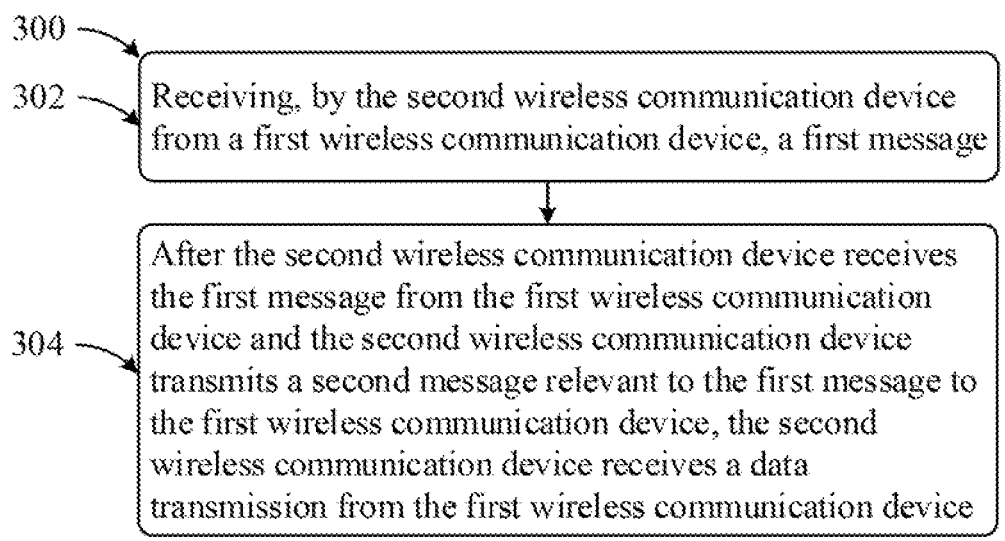
FIG. 4 is a flowchart illustrating a wireless communication method performed by a second wireless communication device according to an embodiment of the present disclosure.

FIG. 4 illustrates a wireless communication method 300 performed by a second wireless communication device according to an embodiment of the present disclosure. In some embodiments, the method 300 includes: a block 302, receiving, by the second wireless communication device from a first wireless communication device, a first message, and a block 304, after the second wireless communication device receives the first message from the first wireless communication device and the second wireless communication device transmits a second message relevant to the first message to the first wireless communication device, the second wireless communication device receives a data transmission from the first wireless communication device. This can solve issues in the prior art, solve a hidden node issue, reduce signaling overhead, provide a good communication performance, and/or provide high reliability.

In some embodiments, the second message is used to confirm that the second wireless communication device has received the first message and/or the second message is requested by the first message. In some embodiments, the first message comprises a request transmission message or a request to send (RTS) message and/or the second message comprises a confirmation transmission message or a clear to send (CTS) message. In some embodiments, after the first wireless communication device transmits the first message to the second wireless communication device, but the first wireless communication device does not receive the second message from the second wireless communication device, the first wireless communication device does not transmit the data transmission to the second wireless communication device. In some embodiments, when the first wireless communication device controls the second wireless communication device to receive the first message from the first wireless communication device, the second wireless communication device does not receive the data transmission from the first wireless communication device before the second wireless communication device transmits the second message to the first wireless communication device.

In some embodiments, the first wireless communication device comprises a first user equipment (UE), and the second wireless communication device comprises a second UE. In some embodiments, the first wireless communication device comprises a base station, and the second wireless communication device comprises a user equipment. In some embodiments, the first wireless communication device comprises a UE, and the second wireless communication device comprises a base station. In some embodiments, the base station comprises a generation node B (gNB). In some embodiments, the method further comprises: configuring, by the first wireless communication device to the second wireless communication device, carriers or serving cells for downlink and/or uplink, wherein the carriers comprise a first carrier and a second carrier or the serving cells comprise a first serving cell and a second serving cell; and transmitting, by the first wireless communication device to the second wireless communication device, the first message at the first carrier and/or the second carrier or at the first serving cell and/or the second serving cell.

In some embodiments, when the first wireless communication device transmits, to the second wireless communication device, the first message at one of the first carrier and the second carrier or at one of the first serving cell and the second serving cell, the first wireless communication device receives, from the second wireless communication device, the second message at the first carrier and/or the second carrier or at the first serving cell and/or the second serving cell. In some embodiments, the second message is received by the first wireless communication device in one or more physical resource blocks (PRBs) in frequency domain and/or one or more orthogonal frequency division multiplexing (OFDM) symbols in time domain. In some embodiments, the one or more PRBs are within an active uplink bandwidth part (BWP) of at least one of the carriers. In some embodiments, the one or more PRBs are pre-configured by the first wireless communication device via radio resource control (RRC). In some embodiments, the one or more PRBs are indicated by the first wireless communication device in the first message requesting the second message.

In some embodiments, the one or more OFDM symbols are pre-configured by the first wireless communication device. In some embodiments, the one or more OFDM symbols are indicated by the first wireless communication device in the first message requesting the second message. In some embodiments, the method further comprises the first wireless communication device controlling the second wireless communication device to receive the first message in a first slot, wherein the second message is requested by the first message and in a second slot, and the first slot and the second slot define an offset therebetween. In some embodiments, when a downlink active BWP and an uplink active BWP configured by the first wireless communication device to the second wireless communication device have different subcarrier spacings, the offset is determined according to a reference subcarrier spacing (SCS), where the reference subcarrier spacing comprises at least one of the followings: a minimum SCS between the downlink active BWP and the uplink active BWP, a maximum SCS between the downlink active BWP and the uplink active BWP, a pre-configured value, or a pre-defined value.

In some embodiments, the offset is pre-configured by the first wireless communication device and/or indicated by the first wireless communication device in the first message requesting the second message. In some embodiments, a value of the offset is set such that a first time interval between a last symbol of a channel carrying the first message and a first symbol of a channel carrying the second message is greater than a threshold. In some embodiments, the channel carrying the first message comprises at least one of the followings: a physical downlink control channel (PDCCH), a physical downlink shared channel (PDSCH), or a first reference signal. In some embodiments, the channel carrying the second message comprises at least one of the followings: a physical uplink control channel (PUCCH), a physical uplink shared channel (PUSCH), or a second reference signal. In some embodiments, the threshold is pre-configured or pre-defined. In some embodiments, the threshold is relevant to a UE processing time. In some embodiments, the UE processing time comprises processing time of the first message, processing time of the second message, PDSCH processing time, or PUSCH processing time.

In some embodiments, the first message comprises at least one of the followings: CTS request/trigger information; information about resources for CTS transmission: information about beam direction or transmission configuration/indication information for a requested CTS transmission; information about a carrier index in which the requested CTS transmission is transmitted: a channel access procedure related information for the requested CTS transmission. In some embodiments, the channel access procedure related information comprises at least one of the followings: a channel access type, a channel sensing duration, a cyclic prefix extension length, or a channel access priority class. In some embodiments, the channel access type comprises at least one of the followings: a transmission without channel access sensing, a channel access with directional sensing, a channel access with omni-directional sensing, a channel access type 1, a channel access type 2A, a channel access type 2B, or a channel access type 2C. In some embodiments, the channel access with directional sensing is used to perform an energy detection from a beamformed direction. In some embodiments, the channel access with omni-directional sensing is used to perform an isotropic or quasi-isotropic energy detection. In some embodiments, the second message is carried in a first downlink control information (DCI) format scheduling PDSCH and/or PUSCH.

In some embodiments, the first DCI format comprises DCI format 0_0 and/or DCI format 0_1 and/or DCI format 0_2 and/or DCI format 1_0 and/or DCI format 1_1 and/or DCI format 1_2.

In some embodiments, the first message comprises a first indication field to request one or more second messages from the second wireless communication device. In some embodiments, the first message comprises a CTS request field. In some embodiments, when the first wireless communication device controls the second wireless communication device to receive a CTS request from the CTS request field, the second wireless communication device knows that one or more second messages are requested by the first wireless communication device. In some embodiments, the CTS request field requests a first CTS and/or a second CTS from the second wireless communication device. In some embodiments, the first CTS and the second CTS are configured to be in a same CTS group and the same CTS group corresponds to a dedicated value indicated by the CTS request field. In some embodiments, when the CTS request field indicates a first value, the CTS request field requests the first CTS and the second CTS. In some embodiments, a dedicated value indicated by the CTS request field is for CTS request and another dedicated value indicated by the CTS request field is for not requesting CTS.

In some embodiments, the first DC format comprises a second indication field to indicate whether the first DCI format is for scheduling the data transmission or the first message. In some embodiments, when the second indication field indicates the first value, the first DCI format is used for scheduling the PDSCH or the PUSCH. In some embodiments, when the second indication field indicates the second value, the first DCI format comprises the first message. In some embodiments, the second indication field indicates whether the first DCI format contains the first message. In some embodiments, the first message comprises a third indication field to indicate the carrier index in which a CTS is requested. In some embodiments, the first message is carried in a second DC format or a group-common PDCCH, where the second DCI format is transmitted in the group-common PDCCH. In some embodiments, the second DC format comprises a set of bits, where the first message for a given UE starts from a starting bit for a length of N bits. In some embodiments, a value of N is a bit size of the first message, and N is an integer greater than or equal to 1. In some embodiments, for a given UE, a location of the starting bit is configured by the first wireless communication device to the second wireless communication device via RRC. In some embodiments, the value of N is pre-defined and/or pre-configured.

In some embodiments, the second DCI format comprises a DCI format 2_0. In some embodiments, when the first message uses a different transmit beam from a PDSCH transmit beam, the first message comprises information about whether a CTS transmit beam corresponds to an RTS transmit beam or corresponds to the PDSCH transmit beam. In some embodiments, when the CTS transmit beam corresponds to the RTS transmit beam, the CTS transmit beam corresponds to a receiver beam from the second wireless communication device with which the second wireless communication device receives the first message. In some embodiments, the RTS transmit beam is pre-configured by the first wireless communication device via RRC or a medium access control (MAC) control element (CE). In some embodiments, when the CTS transmit beam corresponds to the PDSCH transmit beam, the CTS transmit beam corresponds to the receiver beam from the second wireless communication device with which the second wireless communication device receives a PDSCH. In some embodiments, the PDSCH transmit beam is pre-configured or indicated by a DCI format scheduling the PDSCH via a transmission configuration indication or via MAC-CE.

In some embodiments, when the CTS transmit beam corresponds to the receiver beam from the second wireless communication device, the CTS transmit beam covers the receiver beam from the second wireless communication device. In some embodiments, when the CTS transmit beam covers the receiver beam from the second wireless communication device, a width of the receiver beam is within a width of the CTS transmit beam and/or a direction of the CTS transmit beam is same as or opposite to a direction of the receiver beam. In some embodiments, when the first wireless communication device controls the second wireless communication device to receive the first message and the first message requesting a transmission of the second message, if the first wireless communication device does not receive the second message, the first wireless communication device does not transmit a downlink transmission within a second time interval. In some embodiments, the downlink transmission comprises at least one of the followings: a PDCCH transmission, a PDSCH reception, a synchronization signal block (SSB) transmission, or a channel state information-reference signal (CSI-RS) transmission. In some embodiments, the first wireless communication device controls the second wireless communication device to monitor PDCCH within the second time interval.

In some embodiments, the second time interval starts after the last symbol of the channel carrying the corresponding first message. In some embodiments, the second time interval starts after the last symbol of the channel allocated for transmission of the second message. In some embodiments, the second time interval is pre-configured or indicated in the first message or pre-defined. In some embodiments, the second time interval is equal to or greater than a monitoring period of the first message. In some embodiments, when the first wireless communication device controls the second wireless communication device to detect the RTS according to a set of RTS monitoring occasion or a set of PDCCH monitoring occasion associated with the RTS detection. In some embodiments, for a CTS transmission, if the second wireless communication device does not transmit the CTS due to channel access failure, the second wireless communication device still needs to monitor the PDCCH within the second time interval.

In some embodiments, when a first case is allowed by a communication specification, the second wireless communication device continues monitoring the PDCCH within the second time interval when the second wireless communication device does not transmit a requested CTS due to a channel access failure, where the first case comprises that a DC format is detected before a given RTS monitoring occasion and a corresponding scheduled PDSCH or a CSI-RS by the DCI format arrives after the given RTS monitoring occasion; or otherwise when the first case is not allowed by the communication specification, the second wireless communication device does not need to monitor the PDCCH within the second time interval when the second wireless communication device does not transmit the requested CTS due to the channel access failure. In some embodiments, the second message is a pre-configured sequence or a pre-defined sequence. In some embodiments, the second message is carried in a PUCCH format 0 or a PUCCH format 1. In some embodiments, the second message comprises the CTS message, which is an acknowledgement of receiving a corresponding first massage. In some embodiments, the CTS message indicates that the second wireless communication device has performed a successful channel access on one or more channels. In some embodiments, the CTS message comprises a set of bits, where each bit corresponds to an outcome of channel access failure or success on a dedicated channel or a dedicated carrier.

In some embodiments, when the channel access is successful, the corresponding bit is set to a pre-defined value. In some embodiments, a number of bits contained in the CTS message is indicated by the corresponding RTS message. In some embodiments, when the first wireless communication device controls the second wireless communication device to receive a first RTS on a first carrier or a first serving cell and a second RTS on a second carrier or a second serving cell, both the first RTS and the second RTS request a same CTS transmission. In some embodiments, the first wireless communication device is configured to control the second wireless communication device to transmit a CTS message in the CTS, which contains an acknowledgement to the first RTS and the second RTS. In some embodiments, the RTS message comprises an indication corresponding to a location of an acknowledgement bit in the CTS message. In some embodiments, the first RTS indicates that the CTS contains 2 acknowledgement bits and an acknowledgement bit corresponding to the first RTS is located in a first bit. In some embodiments, the second RTS indicates that the CTS contains 2 acknowledgement bits and an acknowledgement bit corresponding to the second RTS is located in a second bit.

In some embodiments, an RTS message is carried in a DC format for scheduling a PUSCH transmission.

In some embodiments, when the first wireless communication device controls the second wireless communication device to receive the RTS message requesting the CTS message from the second wireless communication device, and after the second wireless communication device transmits the CTS message, the second wireless communication device expects a feedback from the first wireless communication device about successfully receiving the CTS message. In some embodiments, when the first wireless communication device controls the second wireless communication device to receive a CTS acknowledgement from the first wireless communication device, the second wireless communication device transmits the PUSCH transmission or a scheduled sounding reference signal (SRS) transmission or a scheduled physical random access channel (PRACH) transmission. In some embodiments, when the second wireless communication device does not receive the CTS acknowledgement from the first wireless communication device or if the second wireless communication device does not transmit the CTS message due to channel access failure, the second wireless communication device cancels the PUSCH transmission or the scheduled SRS transmission or the scheduled PRACH transmission. In some embodiments, the RTS message is carried in a group-common PDCCH, when the first wireless communication device controls the second wireless communication device to receive the RTS message and the RTS requesting the CTS transmission.

In some embodiments, if the second wireless communication device does not transmit the CTS message due to the channel access failure, the second wireless communication device does not transmit a scheduled uplink transmission within a third time interval. In some embodiments, if the second wireless communication device transmits the CTS message, but does not receive an acknowledgement of the CTS message from the first the second wireless communication device, the second wireless communication device cancels the scheduled uplink transmission within the third time interval. In some embodiments, the third time interval is pre-configured or pre-defined or indicated in the RTS message or in the CTS message. In some embodiments, the third time interval has a same duration as the second time interval. In some embodiments, the third time interval starts after the last symbol of the channel carrying the CTS message. In some embodiments, the third time interval starts after the last symbol of the channel carrying an acknowledgement of the CTS message. In some embodiments, when the second wireless communication device cancels the uplink transmission in the third time interval, the second wireless communication device cancels a par of the uplink transmission that is beyond a fourth time interval, where the fourth time interval starts after the last symbol of the channel carrying the acknowledgement of the CTS message.

In some embodiments, the second wireless communication device maintains the uplink transmission on OFDM symbols within the fourth time interval, and the second wireless communication device cancels the uplink transmission on the OFDM symbols after the fourth time interval. In some embodiments, the fourth time interval is relevant to the UE processing time for PUSCH. In some embodiments, the fourth time interval starts after the last symbol of the channel carrying the CTS message.

To solve a hidden node issue, some embodiments propose a method of signaling that can allow a device B to inform a device A about the presence of a hidden node. This method in some embodiments can be applied to a third generation partnership project (3GPP) new radio (NR) technology in shared spectrum operation cases. Some embodiments also introduce a hand-shaking procedure for one to one or one to many communications. The principle of the hand-shaking procedure in some embodiments is presented as follows.

Figure 5:
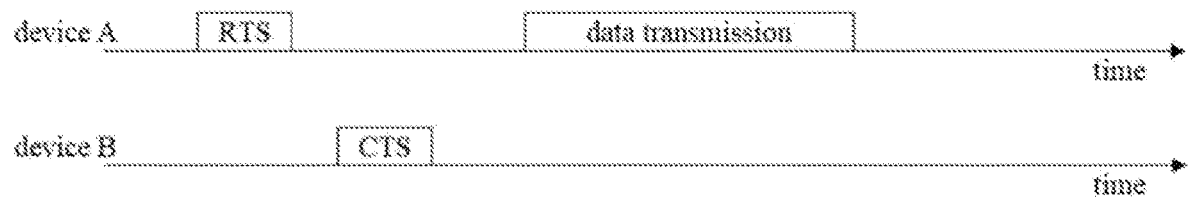
FIG. 5 is a schematic diagram illustrating a device A and a device B in communication with each other according to an embodiment of the present disclosure.

FIG. 5 illustrates a device A and a device B in communication with each other according to an embodiment of the present disclosure. FIG. 5 illustrates that, in some embodiments, the device A intends to transmit a data transmission to the device B, the device A first transmits a message to let the device B know that the device A will transmit a transmission. In the present disclosure, some embodiments denote this message as request transmission (RTS) message (or called a request to send (RTS) message). That is, RTS refers to a request transmission or request to send. When the device B receives the RTS, the device B will feedback a message to the device A to confirm that the device B receives the RTS and this feedback message is called confirmation transmission (CTS) message (or called a clear to send (CTS) message) in some embodiments of the present disclosure. That is, CTS refers to confirmation transmission or clear to send. Once the device A receives the CTS message, the device A will transmit a data transmission to the device B. FIG. 5 illustrates that, in this example of hand-shaking procedure, the data transmission occurs under the condition that the RTS message and the CTS message exchange between the device A and the device B.

Figure 6:
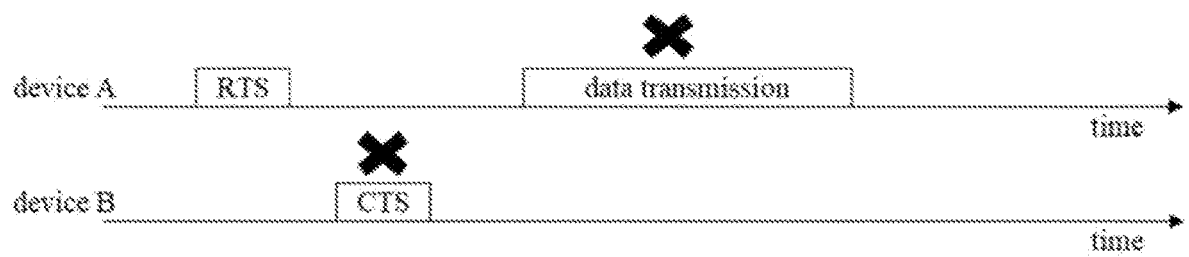
FIG. 6 is a schematic diagram illustrating a device A and a device B in communication with each other according to another embodiment of the present disclosure.

FIG. 6 illustrates a device A and a device B in communication with each other according to another embodiment of the present disclosure. FIG. 6 illustrates that, in some embodiments, after the device A transmits the RTS message to the device B, but the device A does not receive the CTS message from the device B, the device A does not transmit the data transmission to the device B.

Figure 7:
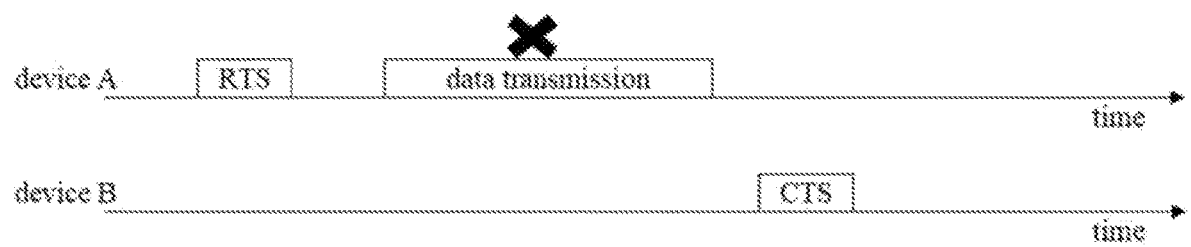
FIG. 7 is a schematic diagram illustrating a device A and a device B in communication with each other according to another embodiment of the present disclosure.

FIG. 7 illustrates a device A and a device B in communication with each other according to another embodiment of the present disclosure. FIG. 7 illustrates that, in some embodiments, when the device B receives the RTS message from the device A, the device B does not receive the data transmission from the device A before the device B transmits the CTS message to the device A.

In some embodiments of the present disclosure, the device A (also called the first wireless communication device) is a base station or gNB, and the device B (also called the second wireless communication device) is a UE. Optionally, the device A is a UE and the device B is a base station or gNB. Optionally, the device A is a UE, and the device B is another UE.

Figure 8:
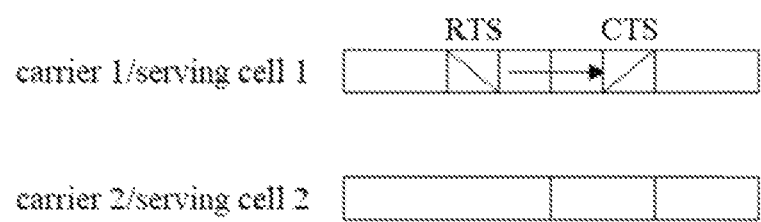
FIG. 8 is a schematic diagram illustrating that when a user equipment (UE) receives a request transmission message or a request to send (RTS) message at a carrier 1 or a serving cell 1, the RTS requests the LE to transmit a confirmation transmission message or a clear to send (CTS) message at the carrier 1 or the serving cell 1 according to an embodiment of the present disclosure.
Figure 9:
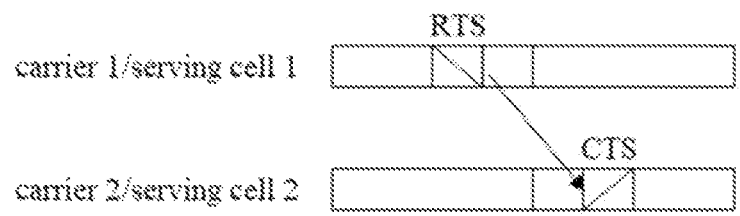
FIG. 9 is a schematic diagram illustrating that when a UE receives an RTS message at a carrier 1 or a serving cell 1, the RTS message requests the UE to transmit a CTS message at a carrier 2 or a serving cell 2 according to an embodiment of the present disclosure.
Figure 10:
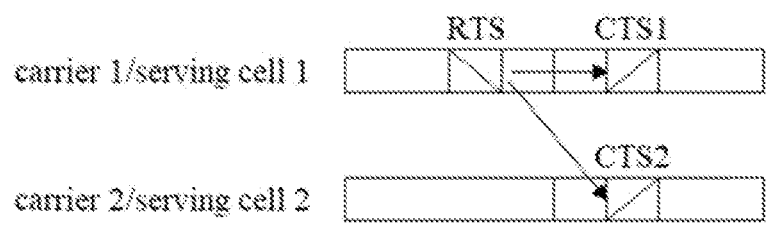
FIG. 10 is a schematic diagram illustrating that when a UE receives an RTS message at a carrier 1 or a serving cell 1, the RTS message requests the UE to transmit a CTS message at the carrier 1 and a carrier 2 or the serving cell 1 and a serving cell 2 according to an embodiment of the present disclosure.

FIG. 8 illustrates that when a UE receives an RTS message at a carrier 1 or a serving cell 1, the RTS message requests the UE to transmit a CTS message at the carrier 1 or the serving cell 1 according to an embodiment of the present disclosure. FIG. 9 illustrates that when a UE receives an RTS message at a carrier 1 or a serving cell 1, the RTS message requests the UE to transmit a CTS message at a carrier 2 or a serving cell 2 according to an embodiment of the present disclosure. FIG. 10 illustrates that when a UE receives an RTS message at a carrier 1 or a serving cell 1, the RTS message requests the UE to transmit a CTS message at the carrier 1 and a carrier 2 or the serving cell 1 and a serving cell 2 according to an embodiment of the present disclosure. FIG. 8 to FIG. 11 illustrate that, in some examples, the UE is configured with more than one carrier, where the UE is configured with two carriers or two serving cells for two carriers or two serving cells for downlink and/or uplink. The UE may receive an RTS message from a gNB at a carrier 1/serving cell 1 and/or a carrier 2/serving cell 2. When the UE receives an RTS message at the carrier 1/serving cell 2, the RTS message may request the UE to transmit a CTS message at the carrier 1/serving cell 1 and/or at the carrier 2/serving cell 2.

In some examples, when the UE transmits a CTS message to the gNB at a carrier/serving cell, the CTS message is transmitted in one or more physical resource blocks (PRB) in frequency domain and/or one or more OFDM symbols in time domain. In some embodiments, the one or more PRBs are within an active uplink BWP of the carrier. In some embodiments, the one or more PRBs are pre-configured by the gNB via RRC. In some embodiments, the one or more PRBs are indicated by the gNB in an RTS message requesting the CTS message. In some embodiments, the one or more OFDM symbols are pre-configured by the gNB via RRC. In some embodiments, the one or more OFDM symbols are indicated by the gNB in an RTS message requesting the CTS message.

Figure 11:
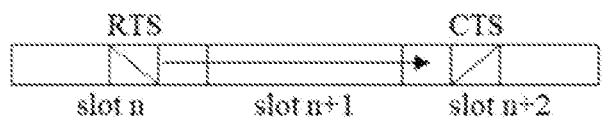
FIG. 11 is a schematic diagram illustrating an offset between a slot in which a UE receives an RTS message and a slot in which a CTS message is requested by the RTS message according to an embodiment of the present disclosure.

FIG. 11 illustrates an offset between a slot in which a UE receives an RTS message and a slot in which a CTS message is requested by the RTS message according to an embodiment of the present disclosure. FIG. 11 illustrates that, in some embodiments, the offset is 2 slots, i.e. assuming the RTS message is received in slot n, and the requested RTS message is in slot n+2. In some examples, when an downlink (DL) active BWP and an uplink (UL) active BWP have different subcarrier spacing, the offset is determined according to a reference subcarrier spacing, where the reference subcarrier spacing (SCS) is at least one of the followings: a minimum SCS between the DL active BWP and the UL active BWP, a maximum SCS between the DL active BWP and the UL active BWP, a pre-configured value, or a pre-defined value. In some embodiments, the offset is pre-configured by the gNB and/or indicated by the gNB in the RTS message requesting the CTS message. In some embodiments, the RTS triggers the CTS message or the RTS message configures CTS time domain information and/or CTS frequency domain information.

Figure 12:
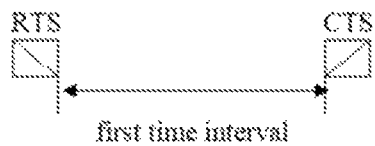
FIG. 12 is a schematic diagram illustrating a first time interval between a last symbol of a channel carrying an RTS message and a first symbol of a channel carrying a requested CTS message according to an embodiment of the present disclosure.

FIG. 12 illustrates a first time interval between a last symbol of a channel carrying an RTS message and a first symbol of a channel carrying a requested CTS message according to an embodiment of the present disclosure. In some embodiments, a value of the offset is set such that the first time interval between the last symbol of the channel carrying the RTS and the first symbol of the channel carrying the requested CTS message is greater than a threshold. In some examples, the channel carrying the RTS message is at least one of the followings: a PDCCH, a PDSCH, or a first reference signal. In some examples, the channel carrying the CTS message is at least one of the followings: a PUCCH, a PUSCH, or a second reference signal. In some examples, the threshold is pre-configured or pre-defined. Optionally, the threshold is relevant to a UE processing time. In some examples, the UE processing time is PDSCH processing time. Optionally the UE processing time is PUSCH processing time. In some examples, the UE processing time is RTS processing time. Optionally the UE processing time is CTS processing time.

In some embodiments, an RTS message may contain one or more information. In some examples, an RTS message includes CTS request/trigger information. In some examples, an RTS message includes information about resources for CTS transmission. In some examples, an RTS message includes information about beam direction (or transmission configuration/indication information) for the requested CTS transmission. In some examples, an RTS includes information about a carrier index in which a requested CTS is transmitted. In some examples, an RTS message includes a channel access procedure related information for the requested CTS transmission. In some embodiments, the channel access procedure related information comprises at least one of the followings: channel access type, channel sensing duration, cyclic prefix extension length, or channel access priority class. In some embodiments, the channel access type includes at least one of the followings: a transmission without channel access sensing, a channel access with directional sensing, a channel access with omni-directional sensing, a channel access type 1, a channel access type 2A, a channel access type 2B, or a channel access type 2C. In some embodiments, the channel access with directional sensing is to perform an energy detection from a beamformed direction. In some embodiments, the channel access with omni-directional sensing is to perform an isotropic or quasi-isotropic energy detection.

In some embodiments, a channel refers to a carrier or a part of a carrier consisting of a contiguous set of resource blocks (RBs) on which a channel access procedure is performed in shared spectrum. In some embodiments, a channel access procedure is a procedure based on sensing that evaluates the availability of a channel for performing transmissions. The basic unit for sensing is a sensing slot with a duration $T_{sl}=9$ us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

Type 1 DL channel access procedures: This describes channel access procedures to be performed by an eNB/gNB where the time duration spanned by the sensing slots that are sensed to be idle before a downlink transmission(s) is random.

Type 2 DL channel access procedures: This describes channel access procedures to be performed by an eNB/gNB where the time duration spanned by sensing slots that are sensed to be idle before a downlink transmission(s) is deterministic.

Type 2A DL channel access procedures: An eNB/gNB may transmit a DL transmission immediately after sensing the channel to be idle for at least a sensing interval $T_{short\_dl}=25$ us. $T_{short\_dl}$ consists of a duration $T_f=16$ us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

Type 2B DL channel access procedures: A gNB may transmit a DL transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.

Type 2C DL channel access procedures: When a gNB follows the procedures in this clause for transmission of a DL transmission, the gNB does not sense the channel before transmission of the DL transmission. The duration of the corresponding DL transmission is at most 584 us.

Uplink channel access procedures: A UE performing transmission(s) on LAA Scell(s), an eNB scheduling or configuring UL transmission(s) for a UE performing transmission(s) on LAA Scell(s), and a UE performing transmission(s) on channel(s) and a gNB scheduling or configuring UL transmission(s) for a UE performing transmissions on channel(s) shall perform the procedures for the UE to access the channel(s) on which the transmission(s) are performed. If a UE fails to access the channel(s) prior to an intended UL transmission to a gNB, Layer 1 notifies higher layers about the channel access failure.

Type 1 UL channel access procedure: This describes channel access procedures by a UE where the time duration spanned by the sensing slots that are sensed to be idle before a UL transmission(s) is random.

Type 2 UL channel access procedure: This describes channel access procedures by UE where the time duration spanned by the sensing slots that are sensed to be idle before a UL transmission(s) is deterministic.

Type 2A UL channel access procedure: If a UE is indicated to perform Type 2A UL channel access procedures, the UE uses Type 2A UL channel access procedures for a UL transmission. The UE may transmit the transmission immediately after sensing the channel to be idle for at least a sensing interval $T_{short\_dl}$=25 us. $T_{short\_dl}$ consists of a duration $T_f$=16 us immediately followed by one slot sensing slot and $T_f$ includes a sensing slot at start of $T_f$. The channel is considered to be idle for $T_{short\_dl}$ if both sensing slots of $T_{short\_dl}$ are sensed to be idle.

Type 2B UL channel access procedure: If a UE is indicated to perform Type 2B UL channel access procedures, the UE uses Type 2B UL channel access procedure for a UL transmission. The UE may transmit the transmission immediately after sensing the channel to be idle within a duration of $T_f$=16 us. $T_f$ includes a sensing slot that occurs within the last 9 us of TI. The channel is considered to be idle within the duration $T_f$ if the channel is sensed to be idle for total of at least 5 us with at least 4 us of sensing occurring in the sensing slot.

Type 2C UL channel access procedure: If a UE is indicated to perform Type 2C UL channel access procedures for a UL transmission, the UE does not sense the channel before the transmission. The duration of the corresponding UL transmission is at most 584 us.

Figure 13:
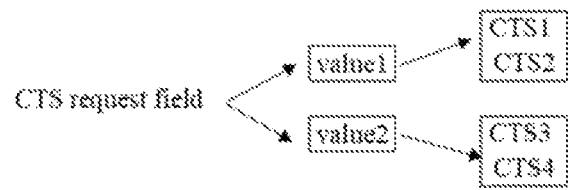
FIG. 13 is a schematic diagram illustrating that a first CTS message and a second CTS message are configured to be in a same CTS group and the same CTS group corresponds to a dedicated value indicated by a CTS request field according to an embodiment of the present disclosure.

In some examples, the RTS message is carried in a first DCI format scheduling PDSCH and/or PUSCH, e.g. DCI format 0_0 and/or DCI format 0_1 and/or DCI format 0_2 and/or DCI format 1_0 and/or DCI format 1_1 and/or DCI format 1_2. In some embodiments, an RTS message may comprise a first indication to request one or more CTS message from the UE. In some embodiments, an RTS message may comprises a CTS request field. When the UE receives the CTS request from the CTS request field, the UE knows that one or more CTS message are requested by the gNB. The CTS request field may request a first CTS message and/or a second CTS message from the UE. FIG. 13 illustrates that a first CTS message and a second CTS message are configured to be in a same CTS group and the same CTS group corresponds to a dedicated value indicated by a CTS request field according to an embodiment of the present disclosure. When the CTS request field indicates value 1, the CTS request field requests the first CTS message and the second CTS message. Optionally, the CTS request field may request one CTS message from the UE.

Figure 14:
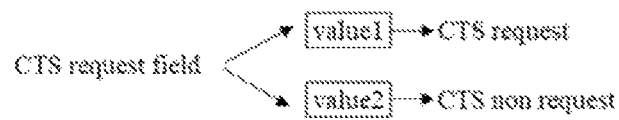
FIG. 14 is a schematic diagram illustrating that a dedicated value indicated by a CTS request field for CTS request and another dedicated value indicated by the CTS request field for not requesting CTS message according to an embodiment of the present disclosure.

FIG. 14 illustrates that a dedicated value indicated by a CTS request field for CTS request and another dedicated value indicated by the CTS request field for not requesting CTS message according to an embodiment of the present disclosure. FIG. 14 illustrates that, in some embodiments, a dedicated value indicated by the CTS request field for CTS request and another dedicated value indicated by the CTS request field for not requesting CTS message.

Figure 15:
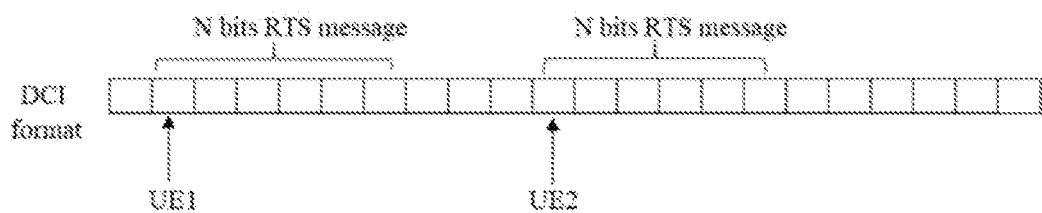
FIG. 15 is a schematic diagram illustrating that an RTS message is carried in a downlink control information (DCI) format (or group-common physical downlink control channel (PDCCH)) according to an embodiment of the present disclosure.

FIG. 15 illustrates that an RTS message is carried in a downlink control information (DCI) format (or group-common physical downlink control channel (PDCCH)) according to an embodiment of the present disclosure. In some examples, a first DCI format comprises a second indication field to indicate whether the first DCI format is for scheduling data transmission or an RTS message. When the second indication field indicates a first value, the first DCI format is used for scheduling PDSCH or PUSCH. When the second indication field indicates a second value, the first DCI format is an RTS message. Optionally, the second indication field indicates whether the DCI format contains the RTS message. In some examples, the RTS message comprises a third indication field to indicate a carrier index in which a CTS message is requested. In some examples, the RTS message is carried in a second DCI format (group-common PDCCH), where the second DCI format is transmitted in a group-common PDCCH. The second DCI format comprises a set of bits, where the RTS message for a given UE starts from a starting bit for a length of N bits. Note that the value of N is the RTS message bit size and N is an integer greater than or equal to 1. In some examples, for a given UE, the starting bit location is configured by the gNB to the UE via RRC. In some examples, the value of N is pre-defined and/or pre-configured. In some examples, the second DCI format comprises a DCI format 2_0.

Figure 16:
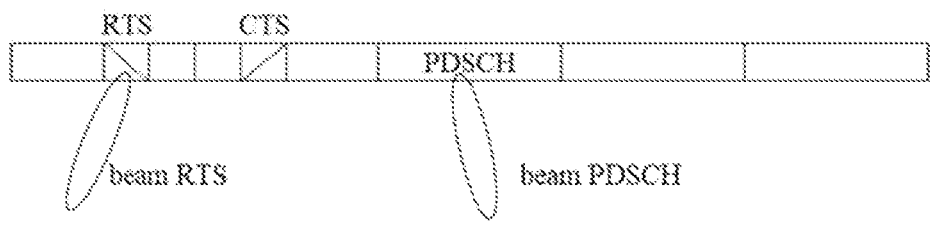
FIG. 16 is a schematic diagram illustrating that an RTS message uses a different transmit beam from a PDSCH transmit beam according to an embodiment of the present disclosure.

FIG. 16 illustrates that an RTS message uses a different transmit beam from a PDSCH transmit beam according to an embodiment of the present disclosure. In some examples, when an RTS message uses a different transmit beam from a PDSCH transmit beam, the RTS message may include an information about whether the CTS transmit beam should correspond to the RTS beam or should correspond to the PDSCH beam. In some embodiment, a CTS transmit beam corresponding to an RTS transmit beam means that the CTS transmit beam is corresponding to the UE receiver beam with which the UE receives the RTS message. In some examples, the RTS transmit beam is pre-configured by the gNB via RRC or MAC-CE. In some examples, a CTS transmit beam corresponding to a PDSCH transmit beam means that the CTS transmit beam is corresponding to the UE receiver beam with which the UE receives the PDSCH. In some examples, the PDSCH transmit beam is pre-configured or indicated by a DCI format scheduling the PDSCH via transmission configuration indication as described in TS 38.212, or via MAC-CE.

Figure 17:
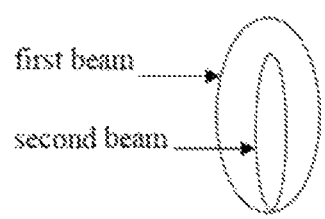
FIG. 17 is a schematic diagram illustrating a first beam covering a second beam according to an embodiment of the present disclosure.

FIG. 17 illustrates a first beam covering a second beam according to an embodiment of the present disclosure. In some examples, a CTS transmit beam corresponding to a UE receiver beam means that the CTS transmit beam shall cover the UE receiver beam. In some embodiments, a first beam covering a second beam means that the second beam-width is within the first beam-width and/or the first beam direction is same as or opposite to the second beam direction.

Figure 18:
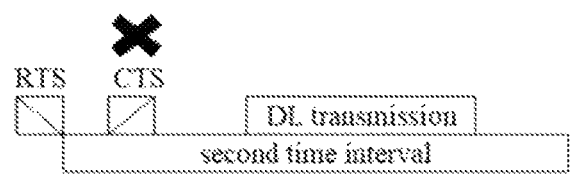
FIG. 18 is a schematic diagram illustrating that if a UE does not transmit a CTS message due to channel access failure, the UE does not receive downlink transmission within a second time interval according to an embodiment of the present disclosure.

FIG. 18 illustrates that if a UE does not transmit a CTS message due to channel access failure, the UE does not receive downlink transmission within a second time interval according to an embodiment of the present disclosure. In some examples, when a UE receives an RTS message and the RTS message requesting a CTS transmission. If the UE does not transmit the CTS message due to channel access failure, the UE does not receive downlink transmission within a second time interval. In some examples, the downlink transmission comprises at least one of the followings: PDCCH reception, PDSCH transmission, SSB reception, or CSI-RS reception. Optionally, the UE still needs to monitor PDCCH within the second time interval.

Figure 19:
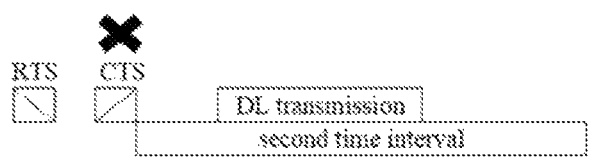
FIG. 19 is a schematic diagram illustrating that if a UE does not transmit a CTS message due to channel access failure, the UE does not receive downlink transmission within a second time interval according to another embodiment of the present disclosure.

FIG. 19 illustrates that if a UE does not transmit a CTS message due to channel access failure, the UE does not receive downlink transmission within a second time interval according to another embodiment of the present disclosure. In some examples, the second time interval starts after the last symbol of the channel carrying the corresponding RTS message. In some examples, the second time interval starts after the last symbol of the channel allocated for CTS transmission. In some examples, the second time interval is pre-configured or indicated in the RTS message or pre-defined. In some examples, the second time interval is equal to or greater than an RTS monitoring period.

Figure 20:
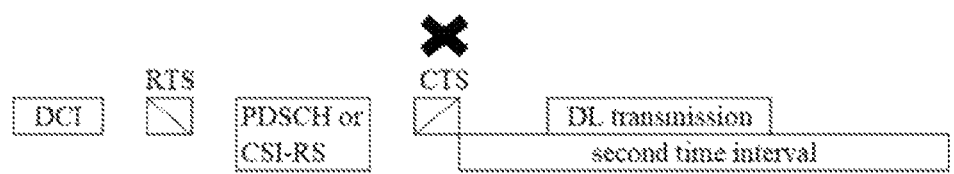
FIG. 20 is a schematic diagram illustrating that a UE continues monitoring PDCCH within a second time interval when the UE does not transmit a requested CTS message due to channel access failure when a case is allowed by a communication specification according to an embodiment of the present disclosure.

In some examples, a UE detects an RTS according to a set of RTS monitoring occasion or a set of PDCCH monitoring occasion associated with RTS detection. In some examples, for a CTS transmission, if the UE does not transmit CTS message due to channel access failure, the UE still need to monitor PDCCH within the second time interval. FIG. 20 illustrates that a UE continues monitoring PDCCH within a second time interval when the UE does not transmit a requested CTS message due to channel access failure when a case is allowed by a communication specification according to an embodiment of the present disclosure. In some examples, when the following case is allowed by the specification, i.e. a DCI format is detected before a given RTS monitoring occasion and the corresponding scheduled PDSCH or CSI-RS by the DCI format arrives after the given RTS monitoring occasion, the UE shall continue monitoring PDCCH within the second time interval when the UE does not transmit a requested CTS message due to channel access failure; or otherwise when the above case is not allowed by the specification, the UE does not need to monitor the PDCCH within the second time interval when the UE does not transmit the requested CTS message due to the channel access failure.

Figure 21:
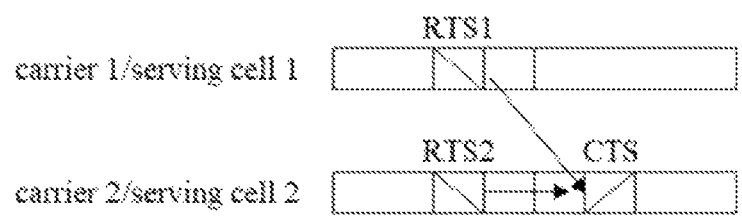
FIG. 21 is a schematic diagram illustrating that when a UE receives a first RTS message on a carrier 1 and a second RTS message on a carrier 2, both the first RTS message and the second RTS message request a same CTS transmission according to an embodiment of the present disclosure.

FIG. 21 illustrates that when a UE receives a first RTS message on a carrier 1 and a second RTS message on a carrier 2, both the first RTS message and the second RTS message request a same CTS transmission according to an embodiment of the present disclosure. In some examples, a CTS message is a pre-configured or a pre-defined sequence. Optionally, a CTS message is carried in the PUCCH format 0 or format 1, assuming HARQ-ACK information is ACK or NACK as described as TS 38.211. In some examples, a CTS includes a CTS message, which is an acknowledgement of receiving a corresponding RTS. In some examples, a CTS message indicates that the UE has performed a successful channel access on one or more channels. In some examples, a CTS message includes a set of bits, where each bit corresponding to an outcome of channel access failure or success on a dedicated channel or a dedicated carrier. When the channel access is successful, the corresponding bit is set to a pre-defined value, e.g. 1 or 0. As illustrates in FIG. 21, where CC1 is denoted for carrier 1 and CC2 is denoted for carrier 2 and so on. In some examples, the number orbits contained in a CTS message is indicated by its corresponding RTS message.

In some examples, when a UE receives a first RTS message on carrier 1 and a second RTS message on carrier 2, both the first RTS message and the second RTS message request a same CTS transmission. The UE transmits a CTS message in the CTS, which contains the acknowledgement to RTS1 and RTS2. In some examples, the RTS message includes an indication corresponding to the location of the acknowledgement bit in the CTS message. e.g. in RTS1 message, it indicates that the CTS contains 2 acknowledgement bits and the acknowledgement bit corresponding to RTS1 is located in the first bit. In RTS2 message, it indicates that the CTS contains 2 acknowledgement bits and the acknowledgement bit corresponding to RTS2 is located in the second bit.

Figure 22:
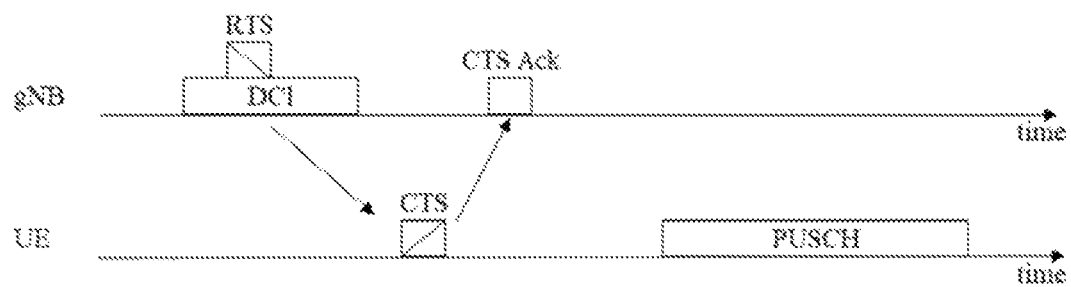
FIG. 22 is a schematic diagram illustrating that when a UE receives an RTS requesting a CTS message from the UE, and after the UE transmits the CTS message, the UE expects a feedback from a gNB about a successfully received CTS message according to an embodiment of the present disclosure.

FIG. 22 illustrates that when a UE receives an RTS requesting a CTS message from the UE, and after the UE transmits the CTS message, the UE expects a feedback from a gNB about a successfully received CTS message according to an embodiment of the present disclosure. In some examples, an RTS message is carried in a DCI format for scheduling PUSCH transmission. When a UE receives the RTS message requesting a CTS message from the UE, and after the UE transmits the CTS message, the UE shall expect a feedback from the gNB about that the gNB has successfully received the CTS message, as illustrated in FIG. 21. When the UE receives the CTS acknowledgement from the gNB, the UE will transmit the PUSCH. Optionally, if the UE does not receive the CTS acknowledgement from the gNB or if the UE does not transmit the CTS message due to channel access failure, the UE will cancel the PUSCH transmission. It is to note that other scheduled uplink transmission is also applicable in this example, such as scheduled SRS transmission, or scheduled PRACH transmission.

Figure 23:
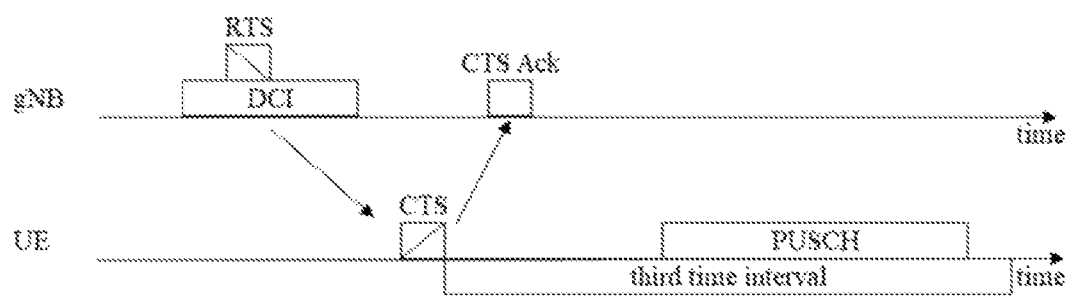
FIG. 23 is a schematic diagram illustrating that if a UE does not transmit a CTS message due to channel access failure, the UE does not transmit a scheduled uplink transmission within a third time interval according to an embodiment of the present disclosure.
Figure 24:
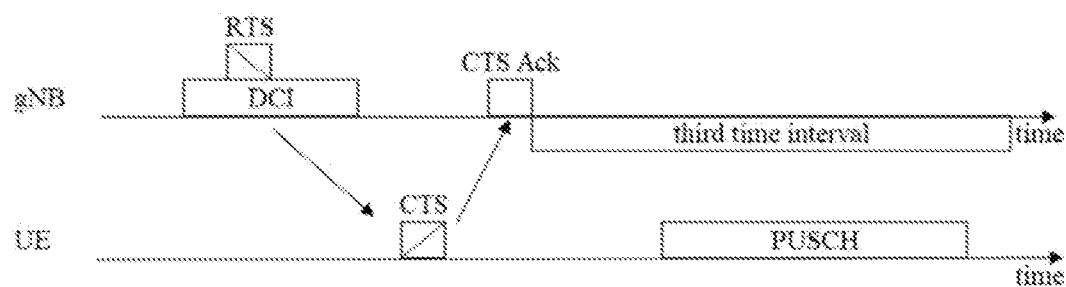
FIG. 24 is a schematic diagram illustrating that if a UE does not transmit a CTS message due to channel access failure, the UE does not transmit a scheduled uplink transmission within a third time interval according to another embodiment of the present disclosure.
Figure 25:
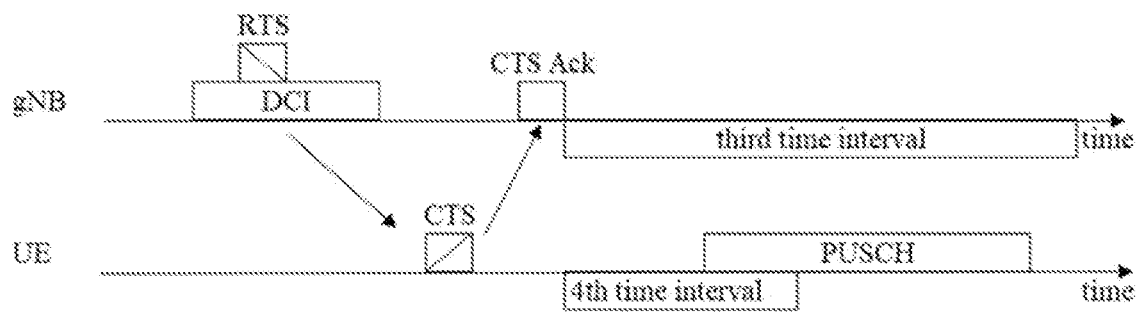
FIG. 25 is a schematic diagram illustrating that when a UE cancels an uplink transmission in a third time interval, the UE only cancels the part that is beyond a fourth time interval according to an embodiment of the present disclosure.
Figure 26:
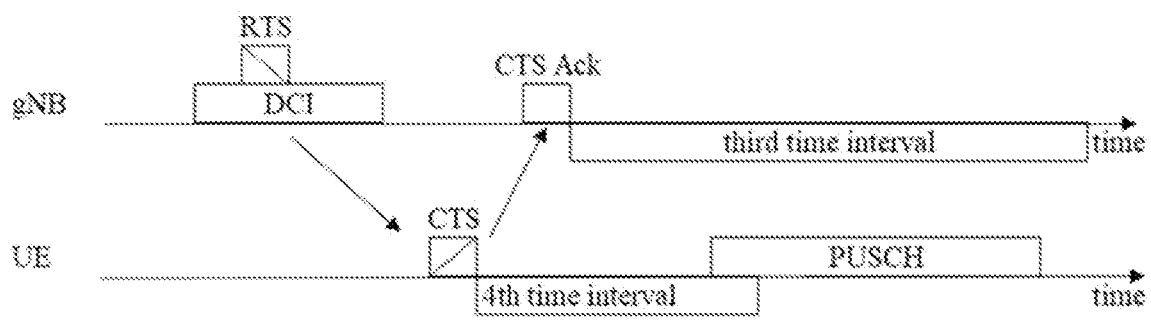
FIG. 26 is a schematic diagram illustrating that when a UE cancels an uplink transmission in a third time interval, the UE only cancels the part that is beyond a fourth time interval according to another embodiment of the present disclosure.

FIG. 23 illustrates that if a UE does not transmit a CTS message due to channel access failure, the UE does not transmit a scheduled uplink transmission within a third time interval according to an embodiment of the present disclosure. FIG. 24 illustrates that if a UE does not transmit a CTS message due to channel access failure, the UE does not transmit a scheduled uplink transmission within a third time interval according to another embodiment of the present disclosure. FIG. 23 and FIG. 24 illustrate that, in some examples, an RTS message is carried in a group-common PDCCH, when a UE receives an RTS message and the RTS message requesting a CTS transmission. If the UE does not transmit the CTS message due to channel access failure, the UE does not transmit a scheduled uplink transmission within a third time interval. In some examples, if the UE transmits the CTS message, but did not receive an acknowledgement of the CTS message from the gNB, the UE will cancel a scheduled uplink transmission within a third time interval. In some examples, the third time interval is pre-configured or pre-defined or indicated in the RTS message or in the CTS message. In some examples, the third time interval has a same duration as the second time interval. In some examples, the third time interval starts after the last symbol of the allocated channel carrying the CTS message. Optionally, the third time interval starts after the last symbol of the allocated channel carrying the acknowledgement of the CTS message FIG. 25 illustrates that when a UE cancels an uplink transmission in a third time interval, the UE only cancels the part that is beyond a fourth time interval according to an embodiment of the present disclosure. FIG. 26 illustrates that when a UE cancels an uplink transmission in a third time interval, the UE only cancels the part that is beyond a fourth time interval according to another embodiment of the present disclosure. FIG. 25 and FIG. 26 illustrate that, in some examples, when a UE cancels the uplink transmission in the third time interval, the UE only cancels the part that is beyond a fourth time interval, where the fourth time interval starts after the last symbol of the channel carrying the acknowledgement of CTS. The UE will maintain the uplink transmission on the OFDM symbols within the fourth time interval, and the UE cancels the uplink transmission on the OFDM symbols after the fourth time interval. In some examples, the fourth time interval is relevant to UE processing time for PUSCH as described in TS 28.214. In some examples, the fourth time interval starts after the last symbol of the channel carrying the CTS message.

Commercial interests for some embodiments are as follows, 1. Solving issues in the prior art. 2. Solving a hidden node issue. 3. Reducing signaling overhead. 4. Providing a good communication performance. 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use. AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR licensed and/or unlicensed or shared spectrum communications. Some embodiments of the present disclosure propose technical mechanisms.

Figure 27:
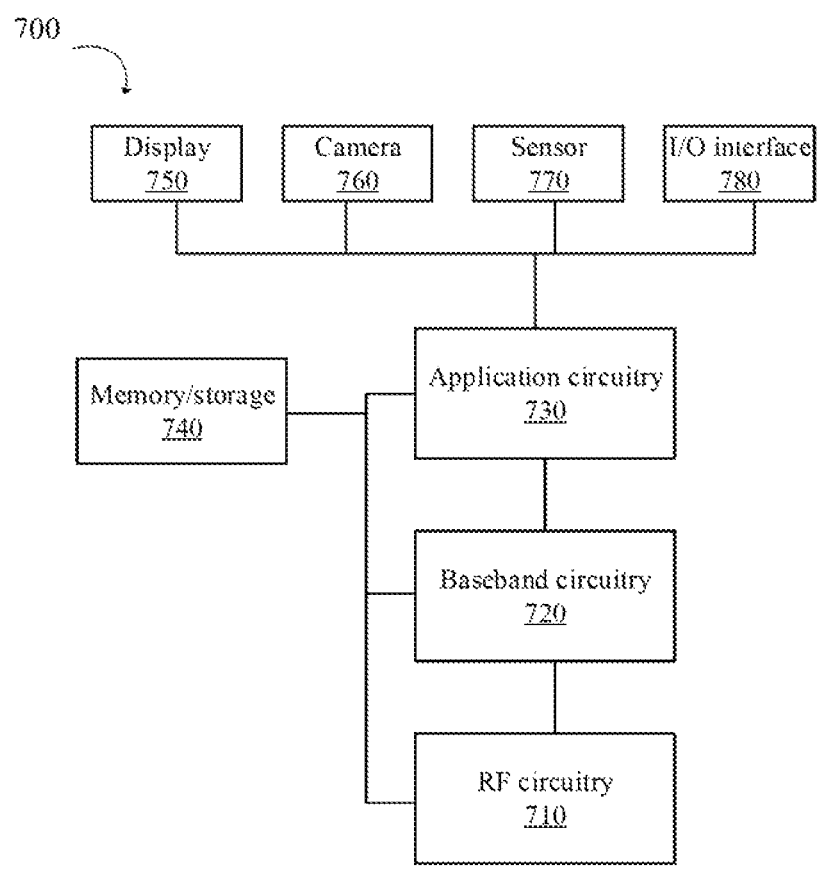
FIG. 27 is a block diagram of a system for wireless communication according to an embodiment of the present disclosure.

FIG. 27 is a block diagram of an example system 700 for wireless communication according to an embodiment of the present disclosure. Embodiments described herein may be implemented into the system using any suitably configured hardware and/or software. FIG. 27 illustrates the system 700 including a radio frequency (RF) circuitry 710, a baseband circuitry 720, an application circuitry 730, a memory/storage 740, a display 750, a camera 760, a sensor 770, and an input/output (110) interface 790, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units. If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a first wireless communication device, comprising:

transmitting, by the first wireless communication device to a second wireless communication device, a first message; and after the first wireless communication device transmits the first message to the second wireless communication device and the first wireless communication device receives a second message relevant to the first message from the second wireless communication device, the first wireless communication device transmits a data transmission to the second wireless communication device, wherein the second message is a pre-configured sequence or a pre-defined sequence, wherein the second message is carried in a PUCCH format 0 or a PUCCH format 1, wherein the second message comprises a clear to send (CTS) message, which is an acknowledgement of receiving a corresponding first massage, wherein the CTS message indicates that the second wireless communication device has performed a successful channel access on one or more channels, wherein the CTS message comprises a set of bits, where each bit corresponds to an outcome of channel access failure or success on a dedicated channel or a dedicated carrier, wherein when the channel access is successful, the corresponding bit is set to a pre-defined value, wherein a number of bits contained in the CTS message is indicated by a corresponding request to send (RTS) message, wherein when the first wireless communication device controls the second wireless communication device to receive a first RTS on a first carrier or a first serving cell and a second RTS on a second carrier or a second serving cell, both the first RTS and the second RTS request a same CTS transmission, wherein the first wireless communication device is configured to control the second wireless communication device to transmit a CTS message in the CTS, which contains an acknowledgement to the first RTS and the second RTS, wherein the RTS message comprises an indication corresponding to a location of an acknowledgement bit in the CTS message, wherein the first RTS indicates that the CTS contains 2 acknowledgement bits and an acknowledgement bit corresponding to the first RTS is located in a first bit, wherein the second RTS indicates that the CTS contains 2 acknowledgement bits and an acknowledgement bit corresponding to the second RTS is located in a second bit.

2. The method of claim 1, wherein the second message is used to confirm that the second wireless communication device has received the first message and the second message is requested by the first message.

3. The method of claim 1, wherein the first message comprises a request transmission message or an RTS message.

4. The method of claim 1, wherein the first wireless communication device comprises a base station, and the second wireless communication device comprises a user equipment, wherein the RTS message is carried in a group-common PDCCH, when the first wireless communication device controls the second wireless communication device to receive the RTS message and the RTS requesting the CTS transmission, wherein if the second wireless communication device does not transmit the CTS message due to the channel access failure, the second wireless communication device does not transmit a scheduled uplink transmission within a third time interval, wherein if the second wireless communication device transmits the CTS message, but does not receive an acknowledgement of the CTS message from the first wireless communication device, the second wireless communication device cancels the scheduled uplink transmission within the third time interval, wherein the third time interval is pre-configured or pre-defined or indicated in the RTS message or in the CTS message, wherein the third time interval has a same duration as the second time interval, wherein the third time interval starts after the last symbol of the channel carrying the CTS message, wherein when the second wireless communication device cancels the uplink transmission in the third time interval, the second wireless communication device cancels a part of the uplink transmission that is beyond a fourth time interval, where the fourth time interval starts after the last symbol of the channel carrying the acknowledgement of the CTS message, wherein the second wireless communication device maintains the uplink transmission on OFDM symbols within the fourth time interval, and the second wireless communication device cancels the uplink transmission on the OFDM symbols after the fourth time interval, wherein the fourth time interval starts after the last symbol of the channel carrying the CTS message.

5. A wireless communication method by a second wireless communication device, comprising:

receiving, by the second wireless communication device from a first wireless communication device, a first message; and after the second wireless communication device receives the first message from the first wireless communication device and the second wireless communication device transmits a second message relevant to the first message to the first wireless communication device, the second wireless communication device receives a data transmission from the first wireless communication device, wherein the second message is a pre-configured sequence or a pre-defined sequence, wherein the second message is carried in a PUCCH format 0 or a PUCCH format 1, wherein the second message comprises a clear to send (CTS) message, which is an acknowledgement of receiving a corresponding first massage wherein the CTS message indicates that the second wireless communication device has performed a successful channel access on one or more channels, wherein the CTS message comprises a set of bits, where each bit corresponds to an outcome of channel access failure or success on a dedicated channel or a dedicated carrier, wherein when the channel access is successful, the corresponding bit is set to a pre-defined value, wherein a number of bits contained in the CTS message is indicated by a corresponding request to send (RTS) message, wherein when the second wireless communication device receives a first RTS on a first carrier or a first serving cell and a second RTS on a second carrier or a second serving cell, both the first RTS and the second RTS request a same CTS transmission, wherein the second wireless communication device is configured to transmits a CTS message in the CTS, which contains an acknowledgement to the first RTS and the second RTS, wherein the RTS message comprises an indication corresponding to a location of an acknowledgement bit in the CTS message, wherein the first RTS indicates that the CTS contains 2 acknowledgement bits and an acknowledgement bit corresponding to the first RTS is located in a first bit, wherein the second RTS indicates that the CTS contains 2 acknowledgement bits and an acknowledgement bit corresponding to the second RTS is located in a second bit.

6. The method of claim 5, wherein the second message is used to confirm that the second wireless communication device has received the first message and/or the second message is requested by the first message.

7. The method of claim 5, wherein the first message comprises a request transmission message or an RTS message.

8. The method of claim 5, wherein the first wireless communication device comprises a base station, and the second wireless communication device comprises a user equipment, wherein the RTS message is carried in a group-common PDCCH, when the second wireless communication device receives the RTS message and the RTS requesting the CTS transmission, wherein if the second wireless communication device does not transmit the CTS message due to the channel access failure, the second wireless communication device does not transmit a scheduled uplink transmission within a third time interval, wherein if the second wireless communication device transmits the CTS message, but does not receive an acknowledgement of the CTS message from the first wireless communication device, the second wireless communication device cancels the scheduled uplink transmission within the third time interval, wherein the third time interval is pre-configured or pre-defined or indicated in the RTS message or in the CTS message, wherein the third time interval has a same duration as the second time interval, wherein the third time interval starts after the last symbol of the channel carrying the CTS message, wherein when the second wireless communication device cancels the uplink transmission in the third time interval, the second wireless communication device cancels a part of the uplink transmission that is beyond a fourth time interval, where the fourth time interval starts after the last symbol of the channel carrying the acknowledgement of the CTS message, wherein the second wireless communication device maintains the uplink transmission on OFDM symbols within the fourth time interval, and the second wireless communication device cancels the uplink transmission on the OFDM symbols after the fourth time interval, wherein the fourth time interval starts after the last symbol of the channel carrying the CTS message.

9. A first wireless communication device, comprising:
a memory;
a transceiver; and
a processor coupled to the memory and the transceiver;
wherein the processor is configured to control the transceiver to transmit to a second wireless communication device, a first message; and
after the transceiver transmits the first message to the second wireless communication device and the transceiver receives a second message relevant to the first message from the second wireless communication device, the transceiver transmits a data transmission to the second wireless communication device, wherein the second message is a pre-configured sequence or a pre-defined sequence, wherein the second message is carried in a PUCCH format 0 or a PUCCH format 1, wherein the second message comprises a (clear to send) CTS message, which is an acknowledgement of receiving a corresponding first massage, wherein the CTS message indicates that the second wireless communication device has performed a successful channel access on one or more channels, wherein the CTS message comprises a set of bits, where each bit corresponds to an outcome of channel access failure or success on a dedicated channel or a dedicated carrier, wherein when the channel access is successful, the corresponding bit is set to a pre-defined value, wherein a number of bits contained in the CTS message is indicated by a corresponding request to send (RTS) message, wherein when the processor controls the second wireless communication device to receive a first RTS on a first carrier or a first serving cell and a second RTS on a second carrier or a second serving cell, both the first RTS and the second RTS request a same CTS transmission, wherein the processor is configured to control the second wireless communication device to transmit a CTS message in the CTS, which contains an acknowledgement to the first RTS and the second RTS, wherein the RTS message comprises an indication corresponding to a location of an acknowledgement bit in the CTS message, wherein the first RTS indicates that the CTS contains 2 acknowledgement bits and an acknowledgement bit corresponding to the first RTS is located in a first bit, wherein the second RTS indicates that the CTS contains 2 acknowledgement bits and an acknowledgement bit corresponding to the second RTS is located in a second bit.

10. The first wireless communication device of claim 9, wherein the second message is used to confirm that the second wireless communication device has received the first message and the second message is requested by the first message.

11. The first wireless communication device of claim 9, wherein the first message comprises a request transmission message or an RTS message.

12. The first wireless communication device of claim 9, wherein the first wireless communication device comprises a base station, and the second wireless communication device comprises a user equipment, wherein the RTS message is carried in a group-common PDCCH, when the first wireless communication device controls the second wireless communication device to receive the RTS message and the RTS requesting the CTS transmission, wherein if a transceiver of the second wireless communication device does not transmit the CTS message due to the channel access failure, the transceiver of the second wireless communication device does not transmit a scheduled uplink transmission within a third time interval, wherein if the transceiver of the second wireless communication device transmits the CTS message, but does not receive an acknowledgement of the CTS message from the transceiver, a processor of the second wireless communication device cancels the scheduled uplink transmission within the third time interval, wherein the third time interval is pre-configured or pre-defined or indicated in the RTS message or in the CTS message, wherein the third time interval has a same duration as the second time interval, wherein the third time interval starts after the last symbol of the channel carrying the CTS message, wherein when the processor of the second wireless communication device cancels the uplink transmission in the third time interval, the processor of the second wireless communication device cancels a part of the uplink transmission that is beyond a fourth time interval, where the fourth time interval starts after the last symbol of the channel carrying the acknowledgement of the CTS message, wherein the processor of the second wireless communication device maintains the uplink transmission on OFDM symbols within the fourth time interval, and the processor of the second wireless communication device cancels the uplink transmission on the OFDM symbols after the fourth time interval, wherein the fourth time interval starts after the last symbol of the channel carrying the CTS message.

13. A second wireless communication device, comprising:
a memory;
a transceiver; and
a processor coupled to the memory and the transceiver;
wherein the processor is configured to control the transceiver to receive from a first wireless communication device, a first message; and
after the transceiver receives the first message from the first wireless communication device and the transceiver transmits a second message relevant to the first message to the first wireless communication device, the transceiver receives a data transmission from the first wireless communication device, wherein the second message is a pre-configured sequence or a pre-defined sequence, wherein the second message is carried in a PUCCH format 0 or a PUCCH format 1, wherein the second message comprises a clear to send (CTS) message, which is an acknowledgement of receiving a corresponding first massage, wherein the CTS message indicates that the processor has performed a successful channel access on one or more channels, wherein the CTS message comprises a set of bits, where each bit corresponds to an outcome of channel access failure or success on a dedicated channel or a dedicated carrier, wherein when the channel access is successful, the corresponding bit is set to a pre-defined value, wherein a number of bits contained in the CTS message is indicated by a corresponding request to send (RTS) message, wherein when the transceiver receives a first RTS on a first carrier or a first serving cell and a second RTS on a second carrier or a second serving cell, both the first RTS and the second RTS request a same CTS transmission, wherein the transceiver is configured to transmits a CTS message in the CTS, which contains an acknowledgement to the first RTS and the second RTS, wherein the RTS message comprises an indication corresponding to a location of an acknowledgement bit in the CTS message;

wherein the first RTS indicates that the CTS contains 2 acknowledgement bits and an acknowledgement bit corresponding to the first RTS is located in a first bit, wherein the second RTS indicates that the CTS contains 2 acknowledgement bits and an acknowledgement bit corresponding to the second RTS is located in a second bit.

14. The second wireless communication device of claim 13, wherein the second message is used to confirm that the transceiver has received the first message and the second message is requested by the first message.

15. The second wireless communication device of claim 13, wherein the first message comprises a request transmission message or an RTS message.

16. The second wireless communication device of claim 13, wherein the first wireless communication device comprises a base station, and the second wireless communication device comprises a user equipment, wherein the RTS message is carried in a group-common PDCCH, when transceiver receives the RTS message and the RTS requesting the CTS transmission, wherein if the transceiver does not transmit the CTS message due to the channel access failure, the transceiver does not transmit a scheduled uplink transmission within a third time interval, wherein if the transceiver transmits the CTS message, but does not receive an acknowledgement of the CTS message from the first wireless communication device, the processor cancels the scheduled uplink transmission within the third time interval, wherein the third time interval is pre-configured or pre-defined or indicated in the RTS message or in the CTS message, wherein the third time interval has a same duration as the second time interval, wherein the third time interval starts after the last symbol of the channel carrying the CTS message, wherein when the processor cancels the uplink transmission in the third time interval, the processor cancels a part of the uplink transmission that is beyond a fourth time interval, where the fourth time interval starts after the last symbol of the channel carrying the acknowledgement of the CTS message, wherein the processor maintains the uplink transmission on OFDM symbols within the fourth time interval, and the processor cancels the uplink transmission on the OFDM symbols after the fourth time interval, wherein the fourth time interval starts after the last symbol of the channel carrying the CTS message.

* * * * *